United States Patent
Hong et al.

(10) Patent No.: US 7,238,385 B2
(45) Date of Patent: Jul. 3, 2007

(54) ANTIFERROMAGNETICALLY COUPLED (AFC) MEDIA WITH FLASH CR INTERLAYER BETWEEN TOP MAGNETIC LAYER AND S2 MAGNETIC LAYER

(75) Inventors: Sooyoul Hong, Sunnyvale, CA (US); Hyung Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 305 days.

(21) Appl. No.: 10/997,538

(22) Filed: Nov. 23, 2004

(65) Prior Publication Data

US 2005/0095462 A1 May 5, 2005

Related U.S. Application Data

(62) Division of application No. 10/052,003, filed on Jan. 16, 2002.

(51) Int. Cl.
*B05D 5/12* (2006.01)
*G11B 5/66* (2006.01)

(52) U.S. Cl. .................................... 427/131; 428/828
(58) Field of Classification Search ................ 428/828, 428/829, 830, 831
See application file for complete search history.

(56) References Cited

U.S. PATENT DOCUMENTS 6,372,330 B1 * 4/2002 Do et al. .................... 428/212
2002/0127433 A1 * 9/2002 Shimizu et al. ........ 428/694 TM

* cited by examiner

*Primary Examiner*—Holly Rickman
(74) *Attorney, Agent, or Firm*—Ben J. Yorks; Irell & Manella LLP

(57) ABSTRACT

A disk for a hard disk drive. The disk includes a S1 layer of magnetic material located over a substrate, and a layer of ruthenium located over the S1 layer. The disk further includes a top layer of magnetic material and a layer of chromium located adjacent to the top magnetic layer. The chromium diffuses into the top layer of magnetic material to magnetically decouple the grains of the magnetic material. Decoupling the grains of the magnetic material reduces the magnetic noise of the disk and improves the signal to noise ratio of the hard disk drive.

5 Claims, 2 Drawing Sheets

ANTIFERROMAGNETICALLY COUPLED (AFC) MEDIA WITH FLASH CR INTERLAYER BETWEEN TOP MAGNETIC LAYER AND S2 MAGNETIC LAYER

This application is a divisional application of U.S. application Ser. No. 10/052,003 filed Jan. 16, 2002.

BACKGROUND OF THE INVENTION

1. Field of the Invention

The subject matter disclosed generally relates to the field of hard disk drives.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a flexure arm to create an subassembly commonly referred to as a head gimbal assembly ("HGA"). The HGA's are attached to an actuator arm that has a voice coil coupled to a magnet assembly. The voice coil and magnet assembly create a voice coil motor that can pivot the actuator arm and move the heads across the disks.

Information is typically stored within annular tracks that extend across each surface of a disk. The voice coil motor can move the heads to different track locations to access data stored onto the disk surfaces. Each track is typically divided into a plurality of adjacent sectors. Each sector may have one or more data fields. Each data field has a series of magnetic transitions that are decoded into binary data. The spacing between transitions define the bit density of the disk drive. It is generally desirable to provide a high bit density to increase the overall storage capacity of the drive.

FIG. 1 schematically shows the layer of a disk 1 that is commonly referred to as an anti-ferromagnetic (AFC) media. The AFC media includes a S1 magnetic layer 2 located over a substrate 3. The S1 layer 2 and substrate 3 are typically separated by an underlayer 4 that strengthens the adhesion of the S1 material.

The S1 magnetic layer 2 is covered with a layer of ruthenium 5 and a top layer of magnetic material 6. The top magnetic layer 6 is protected with an overcoat layer 7, typically a diamond-like-carbon (DLC). The overcoat layer 7 may be covered with a layer of lubricant 8 to minimize any frictional contact between the head and the disk.

AFC media with a layer of ruthenium have been found to have a low thermal decay rate at high density recording. Although it has a lower thermal decay rate, AFC media with a layer of ruthenium has a signal to noise ratio (SNR) that limits the bit density of the hard disk drive. To increase the bit density of the disk drive it is desirable to increase the signal to noise ratio of the disk.

BRIEF SUMMARY OF THE INVENTION

A disk for a hard disk drive. The disk includes a layer of chromium located adjacent to a top layer of magnetic material. The disk also contains a layer of ruthenium located between the chromium and a S1 layer of magnetic material.

DETAILED DESCRIPTION

Disclosed is a disk for a hard disk drive. The disk includes a S1 layer of magnetic material located over a substrate, and a layer of ruthenium located over the S1 layer. The disk further includes a top layer of magnetic material and a layer of chromium located adjacent to the top magnetic layer. The chromium diffuses into the top layer of magnetic material to magnetically decouple the grains of the magnetic material. Decoupling the grains of the magnetic material reduces the magnetic noise of the disk and improves the signal to noise ratio of the hard disk drive.

Figure 2:
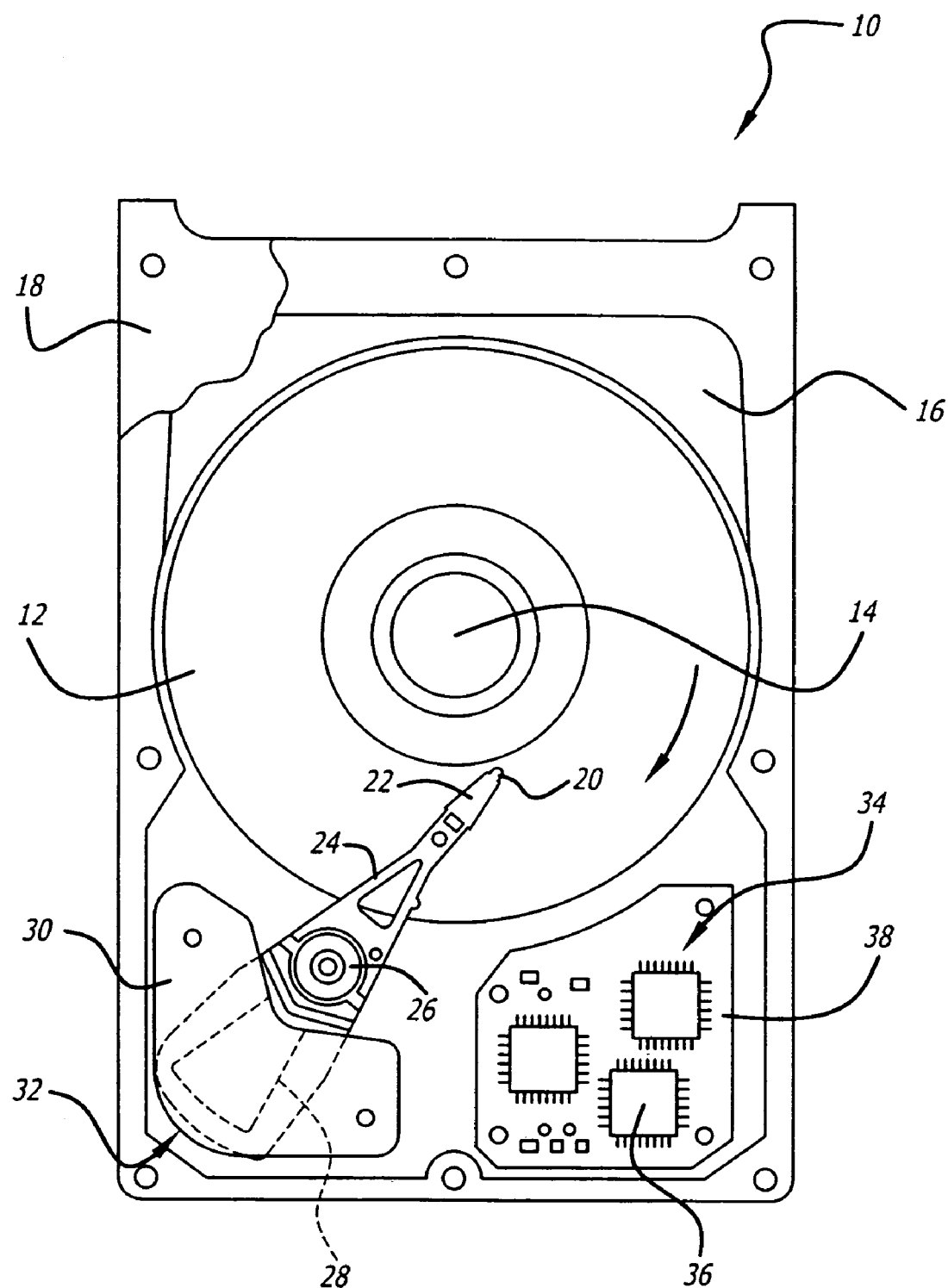
FIG. 2 is a top view of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a flexure arm 22 as part of a head gimbal assembly (HGA). The flexure arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

Each head 20 has an air bearing surface (not shown) that cooperates with an air flow created by the rotating disks 12 to generate an air bearing. The air bearing separates the head 20 from the disk surface to minimize contact and wear. The formation of the air bearing and the general operation of the head 20 is a function of a force exerted by the flexure arm 22.

The hard disk drive 10 may include a printed circuit board assembly 34 that includes a plurality of integrated circuits 36 coupled to a printed circuit board 38. The printed circuit board 38 is coupled to the voice coil 28, heads 20 and spindle motor 14 by wires (not shown).

Figure 1:
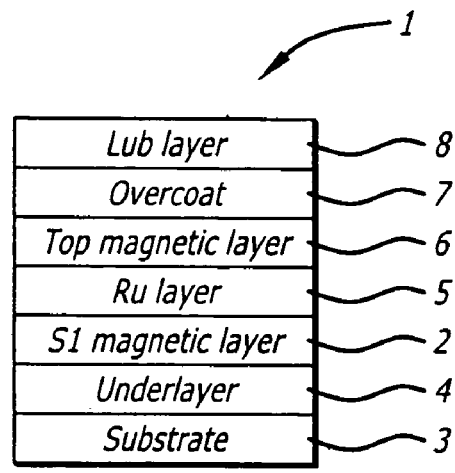
FIG. 1 is an illustration showing the various layers of a disk of the prior art.
Figure 3:
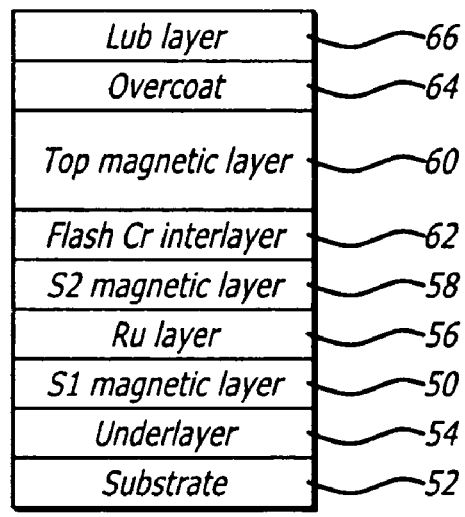
FIG. 3 is an illustration showing various layers of a disk of the hard disk drive.

FIG. 3 shows an embodiment of the disk 12. The disk 12 may include an S1 layer of magnetic material 50 that is located over a substrate 52. An underlayer 54 may be interposed between the substrate 52 and the S1 layer 50 to improve the adhesion of the S1 material. The substrate 52 may be constructed from an aluminum material. The S1 layer may be a cobalt based ferromagnetic material that also contains chromium and platinum.

The S1 layer 50 may be covered with a layer of ruthenium 56. It has been found that ruthenium will increase the thermal stability of the disk 12. The ruthenium 56 may be covered with a S2 layer of magnetic material 58. The S2 layer may be a cobalt based ferromagnetic material that is the same or similar to the material of the S1 layer 50.

The disk 12 has a top layer of magnetic material 60. By way of example, the top layer of magnetic material 60 may include cobalt, chromium, platinum, boron and tantalum. A thin "flash" layer of chromium 62 is formed adjacent to the top magnetic layer 60. By way of example, the layer of chromium 62 may have a thickness ranging from 1.0 to 1.5 nanometers.

The chromium diffuses into the top magnetic layer 60 between the grains of the magnetic material. The diffused chromium reduces the magnetic coupling between the grains of the magnetic layer. Decreasing the magnetic coupling of the grains reduces the magnetic noise within the disk. The lower magnetic noise increases the signal to noise ratio of the hard disk drive. The diffused chromium also improves the thermal stability of the disk by increasing the effective grain volume of the magnetic layer 60.

The disk 12 may include an overcoat layer 64 that protects the underlying magnetic layers. By way of example, the overcoat layer 64 may be a diamond-like-carbon (DLC) material that is extremely hard. To reduce friction between the head and the disk, the outer disk surface may include a layer of lubricant 66.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for fabricating a disk of a hard disk drive, comprising:

forming a layer of S1 magnetic material over a substrate;

forming a layer of ruthenium over the layer of S1 magnetic material;

forming a thin layer consisting of chromium over the layer of ruthenium; and, forming a top layer of magnetic material onto the thin layer of chromium wherein the chromium diffuses into and between grains of the top layer of magnetic material.

2. The method of claim 1, further comprising forming a layer of S2 magnetic material between the layer of ruthenium and thin layer of chromium.

3. The method of claim 2, further comprising forming an underlayer between the substrate and the layer of S1 magnetic material.

4. The method of claim 3, further comprising forming an overcoat layer onto the top layer of magnetic material.

5. The method of claim 4, further comprising forming a layer of lubricant onto the overcoat layer.

* * * * *